United States Patent [19]
Flurry et al.

[11] Patent Number: 5,943,504
[45] Date of Patent: Aug. 24, 1999

[54] SYSTEM FOR TRANSFERRING PIXEL DATA FROM A DIGITIZER TO A HOST MEMORY USING SCATTER/GATHER DMA

[75] Inventors: Gregory Alan Flurry; Jorge Enrique Muyshondt, both of Austin; Bruce James Wilkie, Georgetown, all of Tex.

[73] Assignee: International Business Machines Corporation, Armonk, N.Y.

[21] Appl. No.: 08/833,231

[22] Filed: Apr. 14, 1997

[51] Int. Cl.[6] .................................................. G06F 13/14
[52] U.S. Cl. .................................................. 395/842
[58] Field of Search ................................... 348/719, 515, 348/231; 395/842

[56] References Cited

U.S. PATENT DOCUMENTS

| | | | |
|---|---|---|---|
| 5,388,201 | 2/1995 | Hourvitz et al. | 395/157 |
| 5,499,327 | 3/1996 | Satoh | 395/135 |
| 5,572,691 | 11/1996 | Koudmani | 395/405 |
| 5,585,864 | 12/1996 | Takeuchi | 348/719 |
| 5,682,202 | 10/1997 | Watanabe et al. | 348/231 |
| 5,760,794 | 6/1998 | Munson et al. | 345/515 |

OTHER PUBLICATIONS

IBM TDB, Optimzation of Storage Capacity on Storage Devices Supporting Variable Length Records with Fixed Block Length Medium Constraints, IBM TDB vol. 36 No. 03, pp. 255–258, Mar. 3, 1993.

IBM TDB, Variable Line Length for Alphanumeric CRT Display, IBM TDB o7–78 pp. 783–784, Apr. 1993.

*Primary Examiner*—Thomas C. Lee
*Assistant Examiner*—Abdelmoniem L. Elamin
*Attorney, Agent, or Firm*—Volel Emile; Andrew J. Dillon

[57] ABSTRACT

One aspect of the invention relates to a method for synchronizing control signals with scaled digital video data. In one version of the invention, the method includes the steps of transferring digitized video data from a digitizer to a video scaler which stores the digitized video data to form pixel data and generates a pixel qualifier signal to indicate when pixel data is valid; storing the pixel data into a field memory in response to the pixel qualifier signal from the video scaler; storing control signal data in a control memory in response to the pixel qualifier signal, the control signal data being representative of control signals provided by the video scaler, such that a correspondence is created between the pixel data stored in the field memory and the control signal data stored in the control memory; and transferring the pixel data stored in the field memory and the control signal data stored in the control memory to a bus interface unit, the bus interface unit being coupled to a data bus of a host processor, such that the correspondence between the pixel data and the control signal data is maintained during the transfer.

8 Claims, 17 Drawing Sheets

| REAL LINE | | FAKE LINE | ACTIVE WINDOW |
|---|---|---|---|
| 1 | 640 | 1 } | |
| | | } | |
| 2 | 640 | 2 } | 1 |
| | | } | |
| 3 | 640 | 3 } | |
| 4 | 120 | 4 } | 2 |
| | | } | |
| 4 | 512 | 5 } | 3 |
| 5 | 640 | 6 } | |
| | | } | 4 |
| 6 | 640 | 7 } | |
| 7 | 256 | 8 } | 5 |
| 7 | 384 | 9 } | 6 |
| 8 | | 10 } | 7 |

FIG. 6

| Displayed Lines | SAA7145 Line Count |

| 1-6<br>1-6 | 320 pixels/line<br><br>6 lines |
|---|---|

| 7   129 pixels<br>7 | |
| | 192 pixels   8 |

| 8-12<br>9-13<br><br>5 lines |

| 13   256 pixels<br>14 | 64 pixels<br>15 |

| 14-19<br>16-21<br><br>6 lines |

| 20   64<br>pixels   22 | 256 Pixels   23 |

| 21-25<br>24-28<br><br>5 lines |

| 26   192 pixels<br>29 | 128<br>pixels   30 |

| 27-32<br>31-36<br><br>6 lines |

FIG. 7

```
include <dos.h>
include <stdio.h>
include "typedefs.h"
include "syntax.h"
include "io32.h"
include "stream.h"
include "rps.h"
```

---

```
static BOOLEAN rpsstart = FALSE;

static char     rpscode[4000];        // RPS code will be placed in this memory location
                                      //  into the SAA7145 from here static ULONG StreamBase = 0;

int rps (long nop, long *parms)
{
        int rc = 0;
        int i;
        ULONG r;
        ULONG *rpsc;
        UCHAR *c;
        USHORT ProgramNumber = 1;
        ULONG BranchToHere1;

StreamBase = GetStreamBase( );
        c = (UCHAR  *) parms [0];

switch (c[2])
        {
          Start
          case 'a':
          case 'A':
                if (rpsstart)
                {
                  printf ("Stop first\n");
                  break;
                }
                rpsstart = TRUE;
                rpsc = (ULONG *) (rpscode + 4);
                _FP_OFF (rpsc) = _ FP_OFF (rpsc) & 0xfffc;
                r = ((ULONG) rpsc & 0xffff) + ( ( (ULONG)_FP_SEG (rpsc) ) < < 4);
                if (nop == 2)
                {
                        ProgramNumber = (USHORT) parms[1]; // Could specify different setups
```

FIG. 8A

| | | |
|---|---|---|
| rpsc [i + +] = | 0x00010140; | // For 320 pixels |
| rpsc [i + +] = | LDREG \| 0x14; | |
| rpsc [i + +] = | 0x00010006; | // Starting at 1 for 6 lines |
| rpsc [i + +] = | LDREG \| 0x00; | |
| rpsc [i + +] = | 0xa0000000; | // Address of graphics<br>// adapter frame buffer<br>// where to put pixels |

// Parameters set above take effect after this check for the beginning of an odd field.

| | | |
|---|---|---|
| rpsc [i + +] = | CHECK \| ODD; | |

// Load for partial line at end of (1st) page. This will complete the first 4096 bytes of data transfer (2048 pixels). FPGA will synthesize a horizontal synch at the end of the last pixel to make the SAA7145 think a line has completed.

| | | |
|---|---|---|
| rpsc [i + +] = | CLR \| EAW; | |
| rpsc [i + +] = | LDREG \| 0x10; | |

// Load for partial line at beginnibng of (2nd) page. This completes the partial line that was started above. The real horizontal synch stored in the field buffer is at the end of this line.

| | | |
|---|---|---|
| rpsc [i + +] = | CLR \| EAW; | |
| rpsc [i + +] = | LDREG \| 0x10; | |
| rpsc [i + +] = | 0x000100c0; | // For 192 pixels |
| rpsc [i + +] = | LDREG \| 0x14; | |
| rpsc [i + +] = | 0x00080001; | // Line 8 for 1 line |
| rpsc [i + +] = | LDREG \| 0x00; | |

FIG. 8B

| | | |
|---|---|---|
| rpsc [i + +] = | 0xa0004d00; | // Wait for end of last window |
| rpsc [i + +] = | CHECK \| EAW; | // Load for full lines in middle of (2nd) page |
| rpsc [i + +] = | CLR \| EAW; | |
| rpsc [i + +] = | LDREG \| 0x10; | |
| rpsc [i + +] = | 0x00010140; | // For 320 pixels |
| rpsc [i + +] = | LDREG \| 0x14; | |
| rpsc [i + +] = | 0x00090005; | // Line 9 for 5 lines |
| rpsc [i + +] = | LDREG \| 0x00; | |
| rpsc [i + +] = | 0xa0005780; | // Wait for end of last window |
| rpsc [i + +] = | CHECK \| EAW; | // Load for partial line at end of (2nd) page. Another 2048 pixels |
| rpsc [i + +] = | CLR \| EAW; | |
| rpsc [i + +] = | LDREG \| 0x10; | |
| rpsc [i + +] = | 0x00010100; | // for 256 pixels |
| rpsc [i + +] = | LDREG \| 0x14; | |
| rpsc [i + +] = | 0x000e0001; | // Line 14 for 1 line |
| rpsc [i + +] = | LDREG \| 0x00; | |
| rpsc [i + +] = | 0xa0009600; | // Wait for end of last window |
| rpsc [i + +] = | CHECK \| EAW; | //Load for partial line at beginning of (3rd) page. |
| rpsc [i + +] = | CLR \| EAW; | |
| rpsc [i + +] = | LDREG \| 0x10; | |
| rpsc [i + +] = | 0x00010040; | // for 64 pixels |
| rpsc [i + +] = | LDREG \| 0x14; | |
| rpsc [i + +] = | 0x000f0001; | // Line 15 for 1 line |
| rpsc [i + +] = | LDREG \| 0x00; | |
| rpsc [i + +] = | 0x0009a00; | // Wait for end of last window |
| rpsc [i + +] = | CHECK \| EAW; | // Load for full lines in middle of (3rd) page |
| rpsc [i + +] = | CLR \| EAW; | |
| rpsc [i + +] = | LDREG \| 0x10; | |
| rpsc [i + +] = | 0x00010040; | // for 320 pixels |
| rpsc [i + +] = | LDREG \| 0x14; | |
| rpsc [i + +] = | 0x00100006; | // Line 16 for 6 lines |
| rpsc [i + +] = | LDREG \| 0x00; | |

FIG. 8C

| | | |
|---|---|---|
| rpsc [i + +] = | 0xa000a280; | // Wait for end of last window |
| rpsc [i + +] = | CHECK \| EAW; | // Load for partial line at end of (3rd) page |
| rpsc [i + +] = | CLR \| EAW; | |
| rpsc [i + +] = | LDREG \| 0x10; | |
| rpsc [i + +] = | 0x00010040; | // For 64 pixels |
| rpsc [i + +] = | LDREG \| 0x14; | |
| rpsc [i + +] = | 0x00160001; | // Line 22 for 1 line |
| rpsc [i + +] = | LDREG \| 0x00; | |
| rpsc [i + +] = | 0xa000ed80; | // Wait for end of last window |
| rpsc [i + +] = | CHECK \| EAW; | // Load for partial line at beginning of (4th)page. |
| rpsc [i + +] = | CLR \| EAW; | |
| rpsc [i + +] = | LDREG \| 0x10; | |
| rpsc [i + +] = | 0x00010100; | // for 256 pixels |
| rpsc [i + +] = | LDREG \| 0x14; | |
| rpsc [i + +] = | 0x00170001; | // Line 23 for 1 line |
| rpsc [i + +] = | LDREG \| 0x00; | |
| rpsc [i + +] = | 0xa000ee80; | // Wait for end of last window |
| rpsc [i + +] = | CHECK \| EAW; | //Load for full lines in middle of (4th) page. |
| rpsc [i + +] = | CLR \| EAW; | |
| rpsc [i + +] = | LDREG \| 0x10; | |
| rpsc [i + +] = | 0x00010140; | // for 320 pixels |
| rpsc [i + +] = | LDREG \| 0x14; | |
| rpsc [i + +] = | 0x00180005; | // Line 24 for 5 lines |
| rpsc [i + +] = | LDREG \| 0x00; | |
| rpsc [i + +] = | 0xa000fa00; | // Wait for end of last window |
| rpsc [i + +] = | CHECK \| EAW; | // Load for partial line at end of (4th) page |
| rpsc [i + +] = | CLR \| EAW; | |
| rpsc [i + +] = | LDREG \| 0x10; | |
| rpsc [i + +] = | 0x000100c0; | // for 192 pixels |
| rpsc [i + +] = | LDREG \| 0x14; | |
| rpsc [i + +] = | 0x001d00C1; | // Line 29 for 1 line |
| rpsc [i + +] = | LDREG \| 0x00; | |
| rpsc [i + +] = | 0xa0013880; | // Wait for end of last window |

FIG. 8D

```
            rpsc [i++] =         CHECK | EAW;        // Load for partial line at beginning of (5th) page
            rpsc [i++] =         CLR | EAW;
            rpsc [i++] =         LDREG | 0x10;
            rpsc [i++] =         0x00010080;         // For 128 pixels
            rpsc [i++] =         LDREG | 0x14;
            rpsc [i++] =         0x001e0001;         // Line 30 for 1 line
            rpsc [i++] =         LDREG | 0x00;
            rpsc [i++] =         0xa0013b80;         // Wait for end of last window
            rpsc [i++] =         CHECK | EAW;        // Load for full lines at end of (5th) page.
            rpsc [i++] =         CLR | EAW;
            rpsc [i++] =         LDREG | 0x10;
            rpsc [i++] =         0x00010140;         // for 320 pixels
            rpsc [i++] =         LDREG | 0x14;
            rpsc [i++] =         0x001f0006;         // Line 31 for 6 lines
            rpsc [i++] =         LDREG | 0x00;
            rpsc [i++] =         0xa0014500;         // Wait for end of last window
            rpsc [i++] =         CHECK | EAW;        // finish section
            rpsc [i++] =         CLR | EAW | VFE;
            rpsc [i++] =         CHECK | EAW | VFE;  // indicate done
            rpsc [i++] =         LDREG | 0x34;
            rpsc [i++] =         0x00001000;
            rpsc [i++] =         NOP; // irq in aix
            rpsc [i++] =         PAUSE | EVEN;
            rpsc [i++] =         BranchToHere1;
        break;
        default;
        break;
        }
default:
        rc = INVALID_PARM;
}
return rc;
}
```

FIG. 8E

Overview of Field Capture Method allocate one or more buffers to hold captured field (cap_setup_pool)
    turn on capture (cap_control)
    repeat till done capturing
        request a captured field (cap_get_next)

the 7145 captures the entire field into a user buffer
            the 7145 interrupts the CPU, and the interrupt handler (svc_intr)
                gets called
            cap_get_next returns indicating a field available process the field
            indicate done with field (cap_clear_in_use)

The following logic shows the details. NOTE: most internal error
catching not shown.

cap_setup_pool
    This function sets up a user buffer pool for capture.

if capture active
        return
    if invalid address or number of buffers or buffer size
        return
    clean up any previous pool
    copy user's description of pool
    copy pool element addresses
    for all buffers in pool
        if page alignment incorrect (must start on page boundary)
            return
    malloc space for element information
    prepare system for DMA
    for all elements in pool
       pin buffer
       find bus address for each page in buffer cap_control
    This routine sets up the RPS code needed to run the capture
    process and also removes the code when capture is stopped.

set up the 7140 for the correct scaling
    if capture turned off
      shutdown capture
    else
      if buffers not set up
        return
      if buffer size wrong
        return
      calculate how much RPS code fits in a page (based on the size of
          the field being captured)
      malloc storage for RPS code (buffers, init, skip, finish, etc.)
      setup the RPS buffer for DMA
      put all the bus addresses in the accumulation pool
      build the RPS code for all the capture buffers and ancillary code
          (see build_rps_code )

FIG. 9A initialize buffer pool status to indicate all empty
initialize individual buffer status as available
indicate capture on
indicate dma on
turn on capture hardware on cap_get_next
　This routine returns the index of the next available buffer
　to the user.

if capture not active
　　return
　lock the hardware
　if pool empty or must wait
　　if user does not want to wait for data and don't have to wait
　　　return no data
　　else want or have to wait
　　　if dma off
　　　　return
　　　else legal to wait
　　　　start watchdog timer
　　　　indicate waiting for buffer
　　　　wait for field capture interrupts
　　　　cancel watchdog timer
　　　　if awakened by signal or timer, not capture interrupt
　　　　　clear sleeping flag
　　　　　if awakened by signal
　　　　　　report it
　　　　　else wait busted by timer, so hardware messed up
　　　　　　report it
　　　　　else awakened because buffer full
　　　　　　indicate got data
　　if have data (either already or after wait)
　　　get the last buffer captured
　　　mark buffer as in use by user
　　　decrement number of buffers available
　unlock hardware
　if have data (either already or after wait)
　　　send information to user cap_clear_in_use
　This routine clears the in_use flag for a buffer and gets
　DMA going again, if necessary.

if capture not active
　　return
　lock the hardware
　mark buffer as free for DMA
　if dma is off
　　indicate dma on
　　　put bus address of free buffer into RPS code
　　tell RPS to start DMAing fields
　unlock hardware

FIG. 9B svc_intr
  This is the interrupt handler for the capture device. The hardware
  generates an interrupt after capturing every field.

lock the hardware
    get the hardware interrupt status
    if hardware did not cause interrupt
      return error
      unlock hardware if there is an RPS interrupt
      if it is a capture interrupt
        indicate a field in pool
        find a free buffer in the pool
        put bus address of RPS code for free buffer into RPS code
          (at JUMP at cappodd:)
        if there is no free buffer
          stop RPS from DMAing fields
          indicate dma off
        else
          tell RPS to keep DMAing fields
        if user waiting for a buffer
          indicate got field and wake up user
    unlock hardware build_rps_code
  This function builds the RPS code required to capture the fields
  into the buffer pool.

calculate start bus addresses for RPS code for each buffer in pool
        and calculate the interim page addresses (for fields that
        require more than one page of RPS code)
    determine the cycle limit (based on family)
    calculate actual capture height
    determine the total number of lines (based on family), including
        the fake lines
    generate RPS initialization code

```
// turn video on
LDREG | P7145_VDMAC, VDMAC_EVID_ON
// do a 2 line active window into the first page of the first buffer
LDREG | P7145_XWC, 0x00010040
LDREG | P7145_YWC, 0x00010002
LDREG | P7145_VDBA, <address of pool buffer 0, page 0>
// turn on odd fields only
LDREG | P7145_VPCTL, VPCTL_ODD_ONLY
CLR   | EVEN
CHECK | EVEN
CLR   | EVEN
CHECK | EVEN | VFE
LDREG | P7145_GPIOC, GPIOC_MCB_ON
``` generate jump to code for capturing the odd field (capodd:)

JUMP | RPS_S, <RPS buffer address for appropriate pool buffer>

FIG. 9C set up to start capturing into pool buffer 0
set up the code to skip over the odd field when there is no buffer
  available into which to DMA the field // set up fake window so no DMA takes place
    LDREG | P7145_XWC, 0x00010002
    LDREG | P7145_YWC, 0x00010001
    LDREG | P7145_VDBA, <pool buffer 0, page 0>
    CHECK | EAW
    // now wait for end of fake window
    CLR   | EAW
    CHECK | EAW generate RPS finish field code (finish:)

CLR   | (EAW | VFE)
    // wait for DMA of last pixels in field to finish
    CHECK | (EAW | VFE)
    // indicate a capture interrupt
    LDREG | P7145_ADPA, 0x00001000
    // interrupt the CPU
    IRQ
    // halt the RPS so that interrupt handler has time to set the RPS_S
    STOP generate RPS branch back to capodd:
    JUMP, <address of capodd:> generate RPS code for each buffer in the pool (beginning of loop for buffers)
  initialize cycle count
  initialize RPS code addr
  while the number of real lines captured less than capture height
    get address of page in user buffer
    if need a partial line at the start of a page
      put task in RPS code (put_rps_task)
      increment real line count
    calculate full lines in page
    if at end of field
      indicate done with field
      limit lines captured to what is needed to complete field
    if this is the first page
      put special task in RPS code for first active window CHECK | RPS_S
            LDREG | P7145_XWC, (1 << 16) | width
            LDREG | P7145_YWC, (1 << 16) | height of full lines
            LDREG | P7145_VDBA, <pool buffer address>
            // turn on odd field capture
            LDREG | P7145_VPCTL, VPCTL_ODD_ONLY
            // wait for the odd field to start the capture of full lines
            CHECK | ODD

FIG. 9D

```
                    update pool buffer DMA address and starting line
             else not first page
                 put task in RPS code (put_rps_task)
             if done with field, exit loop
             calculate current real line count
             calculate next partial parameters
             if need partial line at end of page
                 put task in RPS code (put_rps_task)
                 calculate real line count
             else at end of a cycle
                 increment the cycle count
                 if have stored all cycles that fit in a page (cycle limit)
                     insert a branch to the next real page of RPS code JUMP, <address next page of RPS code> start a new set of cycles on new RPS page
                 go to next page of pool buffer
         end of while loop for lines
         put in branch to finish code JUMP, <address of finish: code> end of for loop for buffers put_rps_task
    This routine puts an RPS task into an RPS code sequence.
    This task has parameters that allow this code to be used
    to capture partial lines at the beginning of page or the
    end of a page, or the full lines in between.

store the RPS code for the task

// clear the EAW flag so find end of last AW
             CLR  | EAW
             // set the horizontal active window
             LDREG | P7145_XWC, (1 << 16) | width parameter
             // set the vertical active window
             LDREG | P7145_YWC, (starting line parameter << 16) | height
             // load the address for DMA into pool buffer
             LDREG | P7145_VDBA, <address parameter>
             // wait for the EAW of previous task
             CHECK | EAW update DMA address and starting line
```

FIG. 9E

SYSTEM FOR TRANSFERRING PIXEL DATA FROM A DIGITIZER TO A HOST MEMORY USING SCATTER/GATHER DMA

TECHNICAL FIELD

This invention relates generally to the field of video processing, and more particularly, to techniques for interfacing an incoming stream of digitized video data over a data bus and into the memory of a host processor.

BACKGROUND OF THE INVENTION

Computer processing systems are being increasingly used in real time to processing of video data. In general, these systems include a digitizer which samples an incoming analog video signal, such as an NTSC signal, and converts the sample analog video signal into a suitable digital format. The digitized video data is then provided to a video scaler that scales the digital video data into pixel data which is eventually stored in the host memory and used by the host to recreate images on a display screen, such as a CRT.

Once the pixel data has been generated, it must be interfaced to a data bus on the host processor so that it can be transferred to the host memory. However, there are numerous problems involved in moving continuous flows of real time video data over a host data bus which is operating at a different clock rate and must service requests from other devices. Some of these problems are described in greater detail below with reference to the exemplary PCI data bus.

The PCI bus itself is theoretically capable of moving up to 132 MB/sec, but there are several practical limitations that restrict this transfer rate. Actual PCI implementations have resulted in sustained bandwidths ranging from 24 MB/sec to 118 MB/sec. This performance benchmark is only part of the problem. The specific design of the memory/bus interface is crucial to the efficient transfer of high bandwidth sustained data. Controllers designed to optimize burst operations typically penalize continuous requirements by limiting the duration of time any given device is permitted to access the bus. The addition of bus re-arbitration cycles adds significant latency to the process of transferring image data. This latency poses problems to devices like a video capture adapter that need to stream a continuous flow of data at high speeds.

To compound this, today's video capture PCI interface chips assume that most of the PCI bus bandwidth is available and provide very shallow FIFO's that overflow when the latency in responding to a request becomes large due to other bus activity. The usual recovery mechanism is to discard the contents of the FIFO, reset the DMA pointer to the next valid transfer address, and continue with the transfer from that point. This causes visual artifacts that are very distracting, such as small black strips of pixels that follow any movement in the video image. Previous attempts to alleviate these problems have involved decreasing the necessary bandwidth by scaling down the image and scaling it up with software. However, this also causes degradation in the picture quality.

Another problem occurs due to differing data transfer rates between the incoming video data and the operating speed of the data bus. For example, standard video uses a frequency of 27 MHz while the PCI bus uses a 33 MHz clock. Thus, it is necessary to perform some rate conversion to be able to efficiently transfer data and avoid temporal artifacts.

Another common problem is that today's interface chips assume a large block of contiguous memory is available at the host into which a whole field can be transferred. Modern demand paged operating systems, such as AIX, do not allocate large contiguous blocks of memory. Rather, they partition the memory into discontiguous pages, thus requiring the hardware to change DMA pointers in the middle of a data transfer. It is therefore an object of the present invention to overcome the shortcomings described above. Additional objects and advantages of the present invention will become apparent in view of the following disclosure.

SUMMARY OF THE INVENTION

One aspect of the invention relates to a method for transferring pixel data from a digitizer to a host memory using scatter/gather DMA. In an exemplary embodiment, the method comprises partitioning a contiguous virtual memory buffer in the host into a set of discontiguous real memory pages, the pages being of constant size and operable to store a first amount of pixel data; storing pixel data into a buffer in a bus interface unit; defining a first active window of pixel data in the buffer of the bus interface unit, the first active window having at least one complete line of pixel data, the line including a first number of pixels, the total number of pixels in the first active window being less than a page of memory; transferring the pixels in the first active window to a first page of memory; defining a second active window of pixel data in the buffer of the bus interface unit, the second active window having a partial line of pixel data, the partial line in the second active window having a second number of pixels, the total number of pixels in the partial line being equal to the difference between the number of pixels in a page of memory and the total number of pixels in the first active window; and transferring the pixels in the second active window to the first page of memory.

Another aspect of the invention relates to an apparatus for transferring pixel data from a digitizer to a host memory using scatter/gather DMA. In one embodiment, the apparatus comprises means for partitioning a contiguous virtual memory buffer in the host into a set of discontiguous real memory pages, the pages being of constant size and operable to store a first amount of pixel data; means for storing pixel data into a buffer in a bus interface unit; means for defining a first active window of pixel data in the buffer of the bus interface unit, the first active window having at least one complete line of pixel data, the line including a first number of pixels, the total number of pixels in the first active window being less than a page of memory; means for transferring the pixels in the first active window to a first page of memory; means for defining a second active window of pixel data in the buffer of the bus interface unit, the second active window having a partial line of pixel data, the partial line in the second active window having a second number of pixels, the total number of pixels in the partial line being equal to the difference between the number of pixels in a page of memory and the total number of pixels in the first active window; and a means for transferring the pixels in the second active window to the first page of memory.

BRIEF DESCRIPTION OF THE DRAWINGS

FIG. 6 is a block diagram illustrating the use of active windows to transfer data to the host memory.

FIG. 7 is a block diagram illustrating the use of active windows to transfer pixel data to the host memory.

FIGS. 8A–8E are exemplary RPS code for operation on the bus interface unit.

FIGS. 9A–9E illustrate exemplary pseudo-code according to an embodiment of the invention.

DETAILED DESCRIPTION OF EMBODIMENTS OF THE INVENTION

Figure 1:
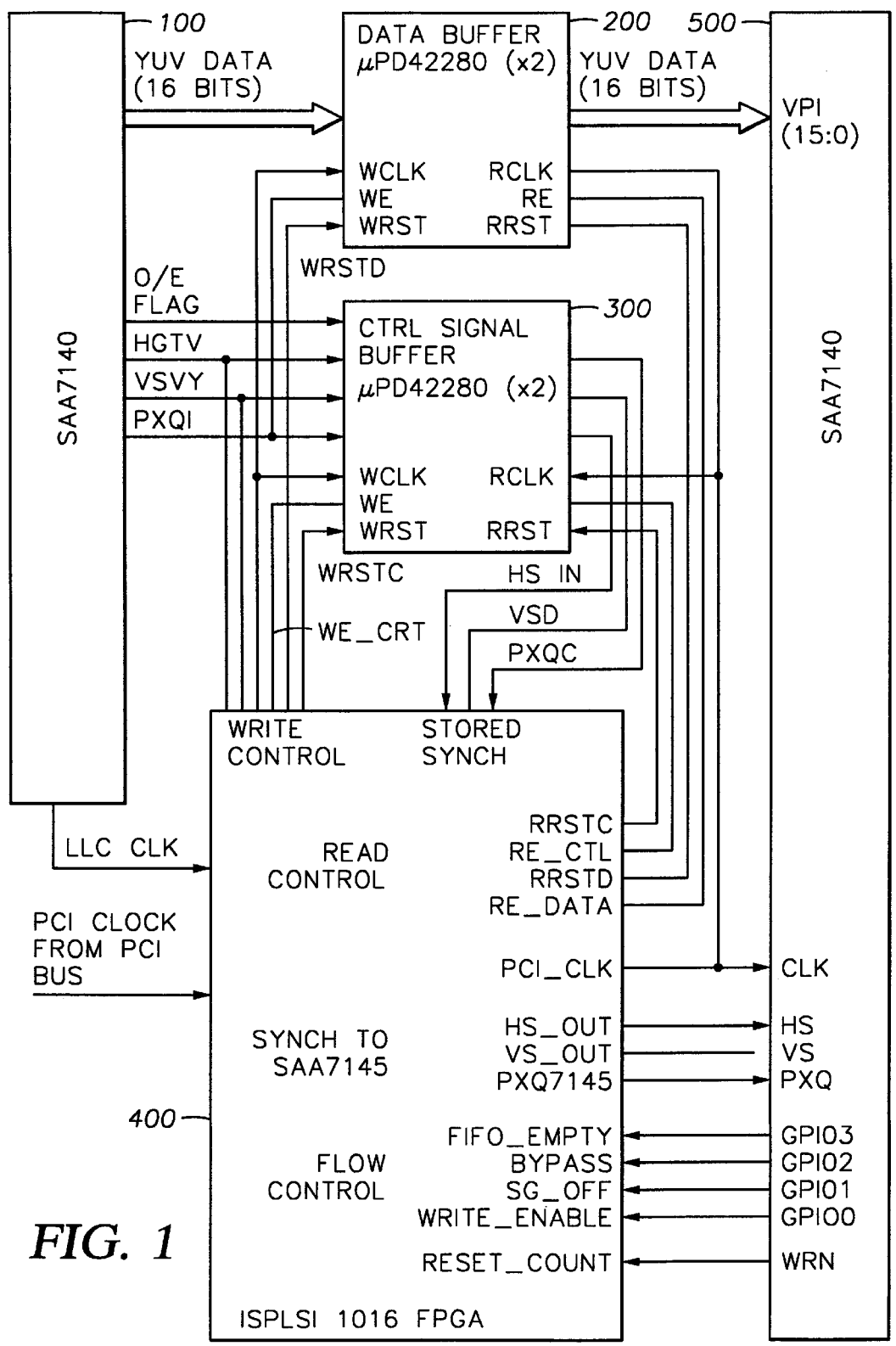
FIG. 1 is a block diagram of a video processing apparatus according to an embodiment of the invention.

Referring now to FIG. 1, there is shown a video processing circuit according to an embodiment of the invention. In this embodiment, there is provided a digital scaler 100, a data buffer, or field memory 200, a control signal memory 300, a memory control block 400 and a bus interface unit 500.

Video data is provided from a suitable digitizer (not shown) to the scaler 100. Digitizing of the incoming analog video signal is performed according to conventional techniques. For example, in the case of an NTSC signal, each line of video includes brightness ("Y") and chroma ("U" and "V") data, as well as control data such as horizontal synchronization and vertical synchronization signals. Other data includes closed caption information, etc., as is conventional. Other video standard signals could, of course, also be used such as PAL, but for purposes of illustration, reference will be made to standard NTSC signals.

NTSC signals are "interlaced" having an even field which begins at the top left of the video screen and sweeps down to the center of the bottom of the screen, and an odd field which begins at the top center of the screen and sweeps down, between the even lines, to the lower right of the screen. One full screen of either odd or even lines is referred to as a complete "field," and the combination of one even field and its corresponding odd field is referred to as a "frame." For purposes of reconstructing a screen of information, only one field of data is required. The remaining interlaced data can be interpolated by the host processor according to known techniques. One specific embodiment of the invention will be described in which the video data is digitized by an SAA7111 enhanced video input processor ("EVIP"), available from Phillips Semiconductors, Inc. In this case, the digitizer digitizes the incoming signal with respect to a 27 MHz clock and samples each line 720 times. The output of the digitizer is in 16-bit format, 8-bits of Y, and 8-bits of U or V, information. The control information is also digitized. This digitized data is then provided to the scaler 100.

In the embodiment of FIG. 1, the scaler 100 is a SAA7140 high performance scaler ("HPS") available from Phillips Semiconductors, Inc., although it will be understood that other similar devices could be substituted as a matter of design choice. The operation of the SAA7140 is described in detail in the corresponding data sheet, also available from Phillips, and will not be described further herein except as it relates to the present invention. The scaler 100 receives digitized video input from the SAA7111 digitizer. After receiving the digitized video data from the digitizer and performing the appropriate scaling operations, the scaler 100 then writes the digitized, scaled YUV data to the field memory 200 and the control data to the control memory 300. The digitized scaled data provided by the scaler 100 is also referred to herein as pixel data.

The data buffer, or field memory 200, illustrated in FIG. 1 is a :PD42280 available from NEC Electronics, Inc., and described in detail in the corresponding data sheet, also available from NEC. The field memory 200 passes data to a bus interface unit 500 which, in turn, places the data onto the bus for transfer to the host memory. In one embodiment, the bus interface unit 500 comprises an SAA7145 multimedia PCI bridge, available from Phillips Semiconductors, Inc., and is described in detail in its corresponding data sheet.

Figure 2:
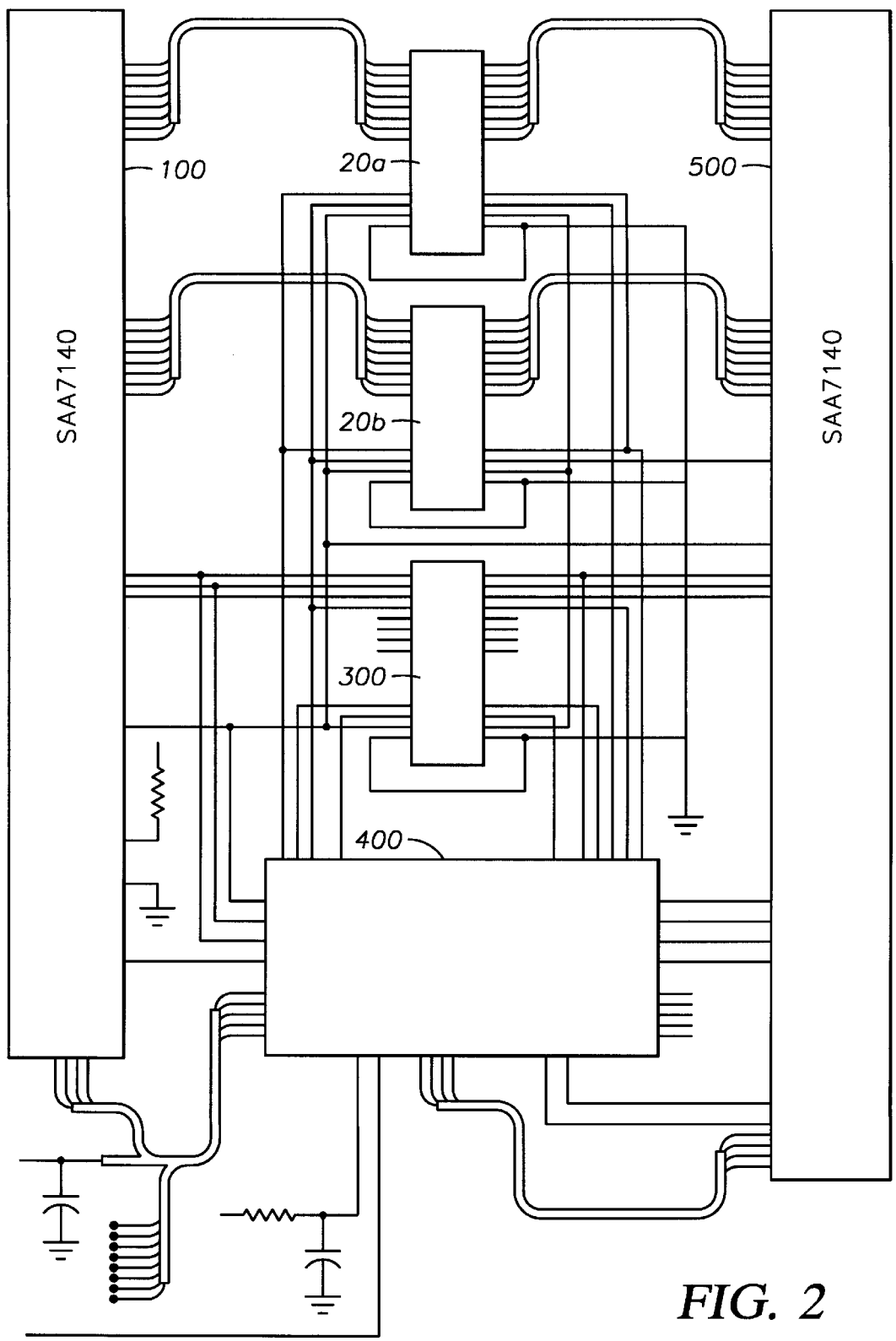
FIG. 2 is a schematic diagram showing a more detailed pinout of a portion of the circuit shown in FIG. 1.

It will be understood that the block diagram shown in FIG. 1 has been simplified in order to illustrate the operation of an embodiment of the invention. A more particular embodiment of the invention is shown in the schematic diagram of FIG. 2. As illustrated in FIG. 2, it is seen that the field memory 200, when implemented with a :PD42280, actually requires the use of two :PD42280 devices, 20a and 20b, since the :PD42280 is 8-bits wide and the data path from the scaler 100 to the bus interface unit 500 is 16-bits wide.

Referring again to FIG. 1, the scaler 100 writes YUV data into the field memory 200 over the 16-bit wide YUV data bus. Writing into the field memory 200 is controlled by a write clock signal ("WCLK"), a write enable signal ("WE"), and a write reset signal ("WRST"). Writing data into the field memory 200 is allowed whenever the write enable signal is asserted. If the WE signal is unasserted, then the scaler 100 is prevented from writing data into the field memory 200. The write clock signal synchronizes the data transfers between the scaler 100 and the field memory 200.

In the present embodiment, the field memory 200 is a first-in-first-out ("FIFO") data buffer. A write pointer is maintained by the field memory 200 to track the next location available for storing pixel data from the scaler 100. Each time a single 16-bit word of pixel data is written from the scaler 100 into the field memory 200, the word is stored in the FIFO buffer and the pointer is advanced. When the pointer reaches the end of FIFO buffer, it is wrapped back to the first buffer location. Additionally, whenever the write reset signal is received by the field memory 200, the write pointer is reset to the first location in the FIFO buffer.

The bus interface unit 500 reads pixel data from the field memory 200. On each read, a 16-bit wide word of pixel data is transferred from a location in the field memory 200 FIFO buffer to the bus interface unit 500. The location of the next word of pixel memory to be fed to the bus interface unit 500 is tracked by a read pointer maintained by the field memory 200. The field memory 200 allows the writing into and reading from the FIFO buffer to occur asynchronously.

Reading from the field memory 200 is controlled by the read clock signal ("RCLK"), the read enable signal ("RE"), and the read reset signal ("RRST"). The read clock signal synchronizes the transfers of pixel data from the field memory 200 to the bus interface unit 500. The read enable signal determines whether the bus interface unit 500 is permitted to read the field memory 200. If the read enable signal is asserted, then reads from the bus interface unit 500 are permitted, otherwise they are inhibited. The read reset signal, when asserted, resets the read pointer to the first location in FIFO buffer.

In one embodiment, the FIFO buffer in the field memory 200 is large enough to hold at least one entire field of pixel data. In the present example, each word of pixel data is 16-bits wide. Assuming 720 samples per line and an NTSC signal having 240 active lines, then the field memory 200 is capable of storing 172.8K words.

Control memory 300 is also implemented as a :PD42280 FIFO buffer in the illustrated embodiment. The pinout of one specific embodiment is shown in FIG. 2. Referring again to the embodiment shown in FIG. 1, it is seen that the data inputs to the control memory 200 are coupled to the control signal outputs of the scaler 100. Specifically, control memory 300 receives the odd/even field flag ("O/E") also referred to herein as "FLDV", which indicates whether the scaler 100 is transmitting the odd or even field of the incoming video data, the horizontal synchronization signal ("HGTV"), the vertical synchronization signal ("VSVY") and the pixel qualifier signal ("PXQV"). These signals are stored in the FIFO buffer of the control memory 300 as a sort of pseudo 4-bit "data word". In other words, each time the scaler 100 performs a write to control memory 300, the control memory 300 samples the state of each of the control signal lines, either high or low, and stores these states into a corresponding bit in one of the FIFO locations, and the write pointer is advanced in a fashion similar to that described with respect to the field memory 200. The read and write control signals, i.e., RCLK, RE, RRST, WCLK, WE and WRST, operate the control memory 300 in substantially the same way as the similarly named signals provided to the field memory 200.

Figure 3:
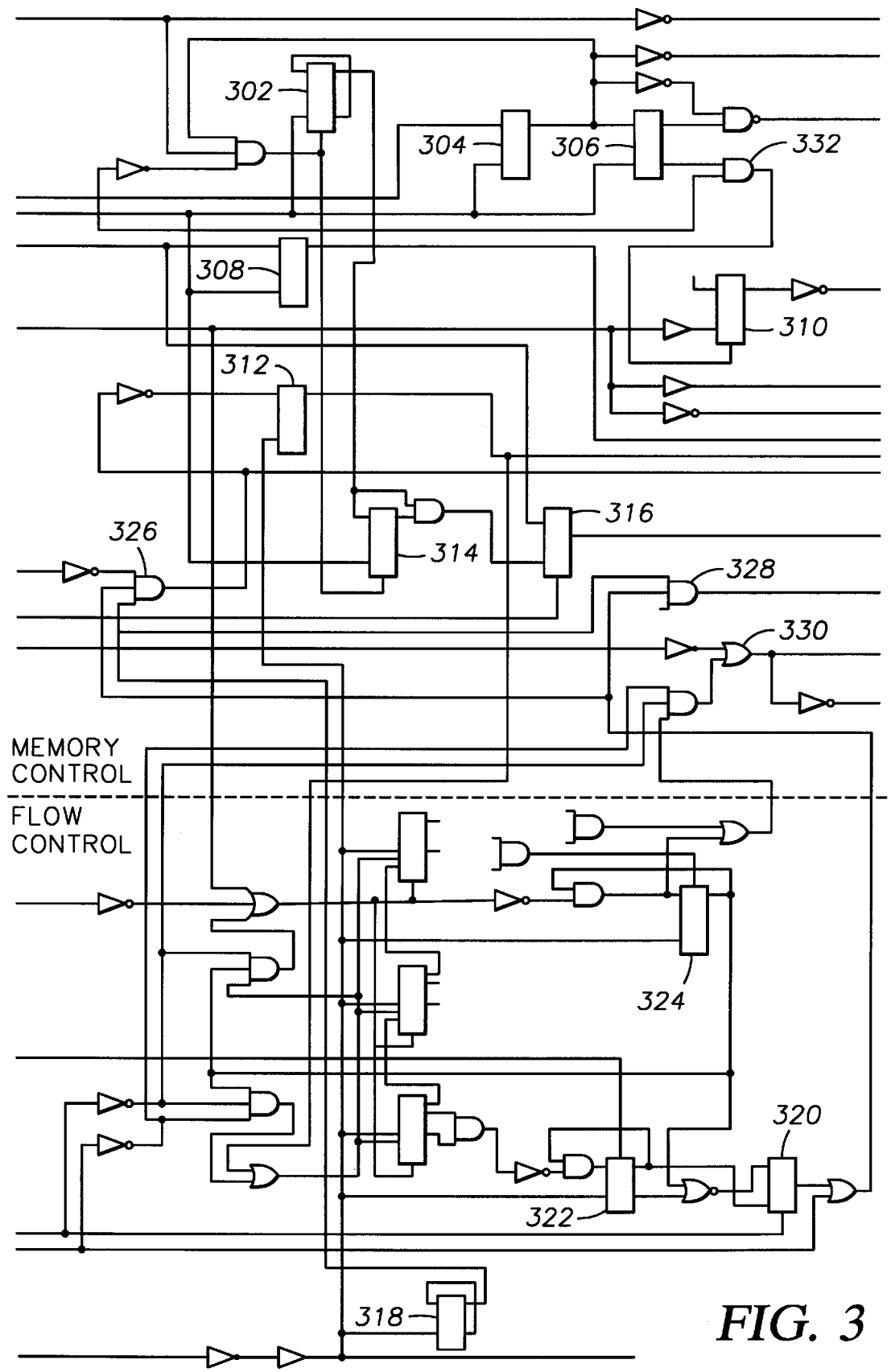
FIG. 3 is a schematic diagram showing a memory control block according to an embodiment of the invention.

Control of field memory 200 and control memory 300, is provided by the memory control block 400. In one embodiment, the memory control block 400 is provided on a field programmable gate array ("FPGA"). One specific embodiment of the memory control block is illustrated by the schematic diagram shown in FIG. 3. The pinout of the specific embodiment shown in FIG. 3 is illustrated in greater detail in FIG. 4.

Figure 4:
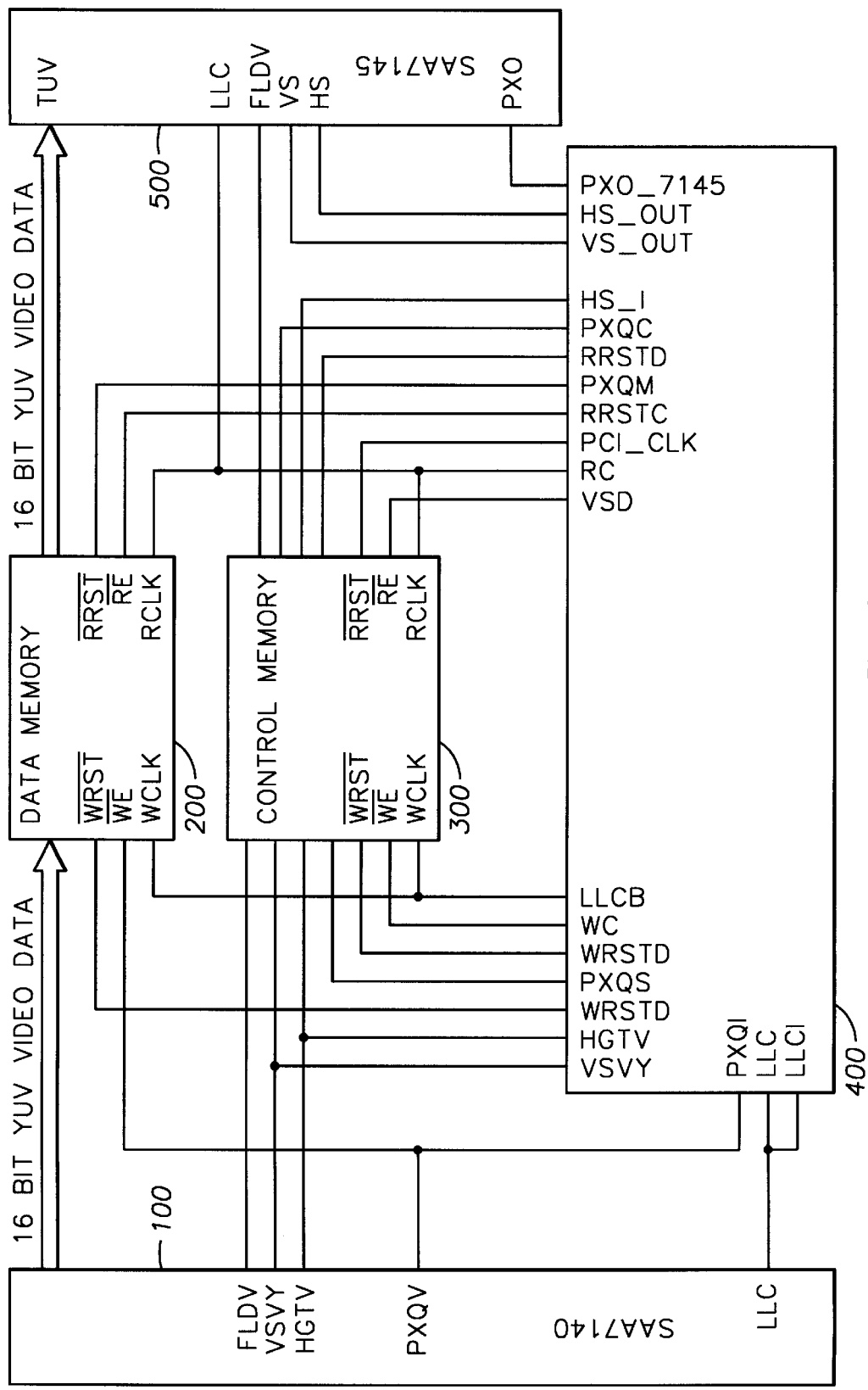
FIG. 4 is a block diagram illustrating signal connections according to the embodiment of the invention shown in FIG. 1.
Figure 5:
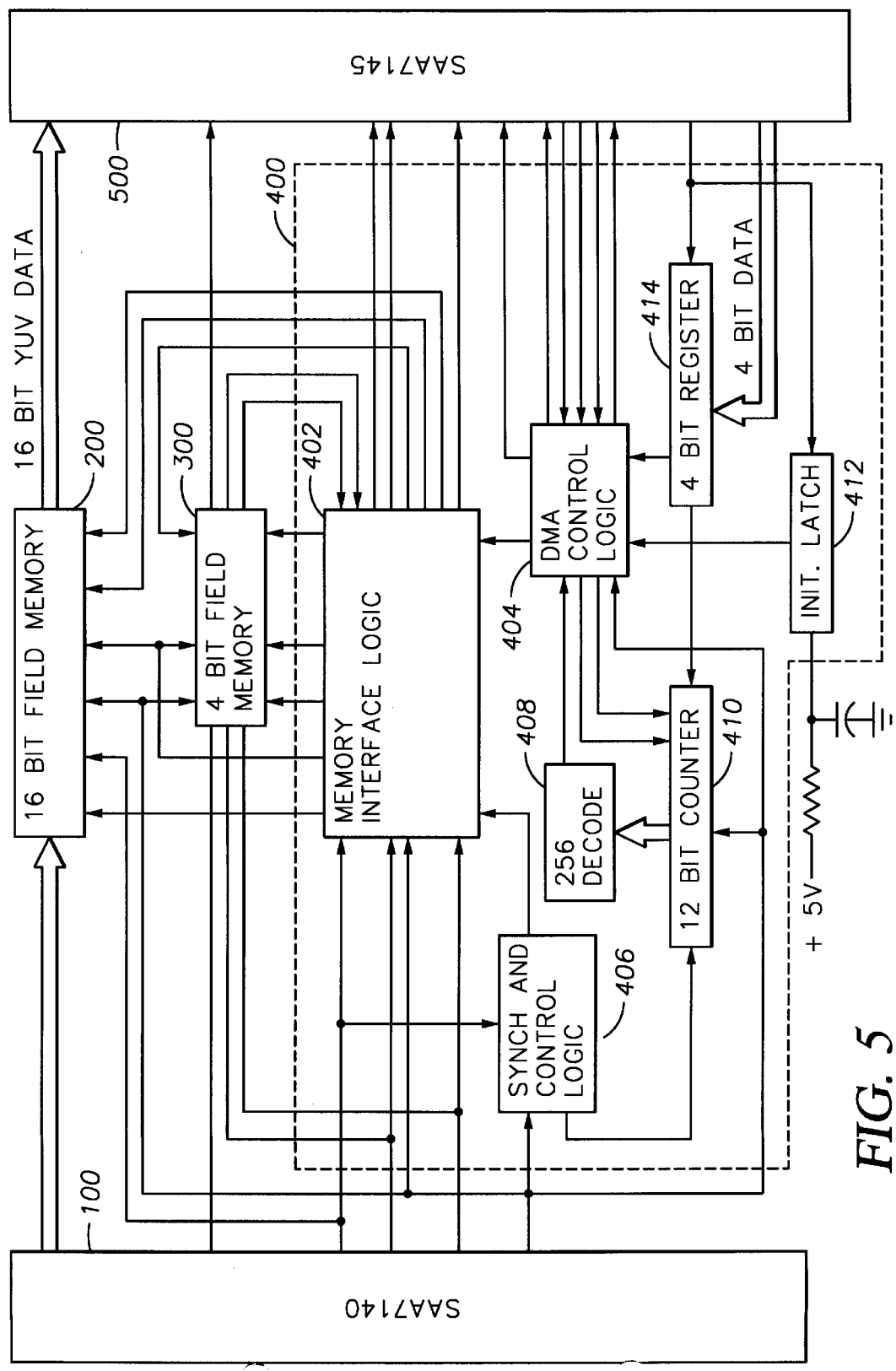
FIG. 5 is a block diagram illustrating greater detail of the memory control block according to an embodiment of the invention.

Referring now to FIGS. 4 and 5, it is seen that FIG. 4 is a block diagram showing the connection between signal lines on the memory control block 400 and the other circuits, and FIG. 5 shows a block diagram providing details of the memory control block 400 according to an embodiment of the invention. In this case, memory control block 400 comprises memory interface logic 402 which is used to provide control signals from the scaler 100 to the field memory 200 and control memory 300. Synchronization and control logic 406 is "glue logic" which is used to assist the memory interface logic 402 and accurately interfacing the scaler 100 to the field memory 200 and control memory 300. It will be understood that, depending on the actual circuits used to implement an embodiment of the invention, the synchronization and control logic 406 will vary, and thus, its actual implementation is a matter of design choice dependent on the scaler 100, field memory 200, and control memory 300.

DMA control logic 404 operates with decoder 408 and counter 410 in order to control interfacing between the bus interface unit 500 and the data bus (not shown) of the host processor. Four-bit register 414 provides data from the bus interface unit 500 to the counter 410 and the DMA control logic 404. Initialization latch 412 is a flip-flop which operates to reset the memory control block 400 on start up of the system. The operation of the elements referred to above will be described in greater detail with respect to various embodiments of the invention.

In operation, one embodiment of the invention provides accurate alignment of the horizontal and vertical synchronization signals with the pixel data, regardless of the scale factor applied by scaler 100. More specifically, in order for the host computer to accurately reproduce a display screen from the pixel data, the pixel data must be properly aligned in the host memory. However, the pixel data can not be properly aligned unless it is stored in relation to the horizontal and vertical synchronization signals received with the pixel data from the scaler 100.

In conventional systems, synthetic synchronization signals are created by logic which counts the number of pixel data words in a line then generates the required synchronization signal. For example, in the present illustration in which there are 720 samples per line, then, after an initial horizontal synch signal, a counter counts 720 transferred pixel words then generates a synthetic synchronization signal to the bus interface unit 500. This operates internal counters in the bus interface unit 500 so that the line of pixel data is properly transferred via a DMA request to the correct locations in the host memory.

If the pixel data is scaled by scaler 100, then the synthetic synchronization signal generators are scaled in the same way. However, this method of scaling suffers from the disadvantage that if the digitized video data is scaled to a fractional number, for example 3.5, then performing the calculations required to generate the synthetic synchronization signals become difficult, often involving floating-point calculations.

In one embodiment of the present invention, alignment of the synchronization signals with the pixel data is accomplished by keeping a one to one correspondence between data stored in the control memory 300 and the field memory 200. Referring again to FIG. 4, it is seen that the scaler 100 provides a pixel qualifier signal ("PXQV") to both the field memory 200 and the memory control block 400. At memory control block 400, the pixel qualifier signal is "PXQI". In operation, the pixel qualifier signal is asserted when the scaler 100 outputs valid pixel data to the field memory 200. If a scale factor of 1, i.e., no scaling, is provided by the scaler 100, then on each qualified transition of the LLC clock, assuming a continuous input stream from the digitizer, the scaler 100 outputs valid pixel data. However, if the scaler 100 applies a scale factor, then valid pixel data is output from scaler 100 only on selected clocks, depending on the scale factor.

The pixel qualifier signal is not coupled directly to the write enable of control memory 300. Rather, the write enable of control memory 300 is operated by the WC signal provided by memory interface logic 402 of memory control block 400. This is shown in more detail in FIG. 3.

The pixel qualifier signal PXQV from scaler 100 is provided to the pixel qualifier input PXQI of the memory control block. This signal is provided to latch 308 which is clocked by the LLC signal from the scaler 100. PXQI is also provided to latch 316 which is operated as a function of the LLC and VSVY signals as shown in the block diagram of FIG. 3. When latch 316 is clocked, the PXQI signal is passed to the WC output of the memory control block 400. This signal then asserts the write enable of control memory 300. Thus, in essence each memory will store data from the scaler 100 only when there is valid pixel data.

The write pointers of the field memory 200 and the control memory 300 will advance simultaneously with each transfer of data from the scaler 100. Thus, a one-to-one correspondence is maintained between each word of pixel data stored in the FIFO buffer of field memory 200 and the related 4-bits of data stored in a corresponding location in control memory 300 which represent the status of the control signals for the particular word of pixel data. This one-to-one correspondence is also maintained during the reads from the bus interface unit 500. This enables bus interface unit 500 to accurately receive the corresponding synchronization signals for each pixel data transferred from field memory 200, regardless of the scaling factor.

More specifically, the read enable of field memory 200 is operated by the PXQM signal (also referred to as "RE__

Data") generated by memory control block 400. To generate the PXQM signal, memory control block 400, first receives the PXQI signal from the scaler 100. This signal is provided to latch 308 which is clocked by the LLC clock from scaler 100. Once the PXQI signal is clocked through latch 308, it is output as PXQS and provided to an input of control memory 300 where it is stored. When this value is read out of control memory 300, it is passed back to memory control block 400 at input PXQC. This signal passes through an inverter to NAND gate 326. When the PCI_Clk2 signal and the enable read signals are also asserted at NAND gate 326, then memory control block 400 asserts the PXQM signal, allowing data to be transferred from the field memory 200 to the bus interface unit 500. The enable read signal provided at NAND gate 326 is a function of the FIFO empty signal which is passed to memory control block 400 from GPIO3 of the bus interface unit 500. This signal informs the memory control block 400 that the data buffer in the bus interface unit 500 is available to receive data. This is described in greater detail further herein. The PCI_CLK2 signal is, essentially, the PCI bus clock signal which has been divided by 2 by latch 318.

The read enable of control memory 300 is operated by the RC signal (also referred to herein as "RE_Ctl") generated by the memory control block 400. In more detail, the RC signal is provided by NAND gate 328. NAND gate 328 receives the enable read and the PCI_CLK2 signals as inputs. Thus, when the data buffer in the bus interface unit 500 is ready to receive data, the RC signal is asserted at half the PCI bus clock speed.

When pixel data is transferred from field memory 200 to bus interface unit 500, the control signal data associated with the transfer, i.e. VSVY, HGTV and PXQV is provided from control memory 300 to the VSD, PXQC, and HS_In inputs of memory control block 400. Memory control block 400 then uses these signals to generate the synchronization signals VS_Out, HS_Out and PXQ_7145.

The generation of PXQC is described above. When the PXQC signal, PCL_CLK2 and the enable read are all asserted at NAND gate 326, a signal is provided to latch 312. Latch 312 is clocked by the PCI bus clock. When this signal is asserted, and latch 312 is clocked, then the PXQ_7145 signal is asserted to the PXQ input of bus interface unit 500. VSD is derived from the VSVY signal transmitted by the scaler 100. This data is stored in a location in the control memory FIFO as described earlier. When the FIFO location containing a particular VSVY signal bit is read, it is passed to the VSD input of memory control block 400. The VSD input is then passed directly to VS_Out and, in turn, to the VS input of the bus unit interface 500. Similarly, HGTV from the scaler 100 is written into a location into the control memory 300 FIFO. When a particular HGTV bit is read from the control memory 300 FIFO, it is passed to the HS_In input of control block 400. This signal is then passed through ORgate 330 to the HS_Out output. The HS_Out signal is then passed to the HS input of bus unit interface 500.

Thus, keeping in mind that PXQM controls the RE of field memory 200, it is seen that this embodiment of the present invention accurately associates the required control signals with corresponding pixel data, regardless of the scale factor used and without the need for complex calculations.

According to another embodiment of the invention, field memory 200 and control memory 300 are used to perform data rate conversion between the scaler 100 and the bus interface unit 500. Specifically, the data stream coming into the system from the digitizer normally does not match the clock speed which controls data transfers on the host processor. Therefore, in order to transfer data from the digitizer to the host memory, data rate conversion must be provided.

In this version of the invention, data rate conversion is provided by the field memory 200 and control memory 300 by controlling their read and write speeds.

Specifically, the pixel data from scaler 100 is written into the field memory 200 at a rate determined by the clock signal provided on the WCLK input. The digitized video data is provided by, for example, a 7111 Digitizer. The output from the 7111 is provided to the scaler 100, in this case, an SAA7140 at 27 MB/sec., which corresponds to a clock speed of 13½ V MHz.

However, the pixel data must be eventually transferred to the PCI bus which operates with a 33 MHz clock. Since the field memory 200 and the control memory 300 are both FIFO's which allow asynchronous reads and writes, they are used to perform the data rate conversion by clocking the writes with the LLC clock provided by the SAA7140 and clocking reads by using the PCI clock.

More specifically, the memory control block 400 allows data to be constantly written into the buffers of memories 200 and 300. The LLC clock provided by the scaler 100 is used to clock data into the memories. The LLC clock is received by memory control block 400 and serves as the basis for generating the LLCB signal. The generation of LLCB has been discussed with respect to FIG. 3. LLCB is then provided to the write clocks of the field and control memories. The pixel qualifier, PXQI, indicates when there are valid pixel data and enables writing of the field memory 200 as discussed previously. It also enables writing of the control memory 300 except during Horizontal Synch times. During Horizontal Synch no data is written into the field memory 200. Data is written into the control memory 300 at ½ the normal rate to reduce the amount of time spent in this mode when the data is read out. This feature of the invention thus compresses the horizontal synchronization times which consume nearly 16% of the period of a horizontal line of video, which represents a significant percentage of time that is wasted in terms of the time required to transfer the video data to the host memory. By storing only every other transfer during the horizontal synchronization time, the horizontal synchronization data is compressed, thus reducing the control memory reading time by approximately 8%. The effect of this is to ensure that data reads are always faster than data writes and thus, prevents overwrites in the field memory FIFO in the event of a bus latency.

As stated previously, the buffers are FIFOs that can be read and written asynchronously. The write pointer is advanced after every write and it is reset to the beginning of the FIFO after every WRST signal. The write pointer of the field memory 200 is reset by WRSTD and the write pointer of the control memory 300 is reset by WRSTC which are generated by memory control block 400. WRSTD is activated by an incoming Vertical Synch ("VSVY") from scaler 100 and remains active for the duration of VSVY. No data is written to the field memory 200 during this time. The field memory 200 contains the YUV data generated by the scaler 100. The data are stored one eight-bit Y value for every pixel and alternating eight-bit U and V values of two pixels. For example, if there are pixels P0, P1, P2, P3, P4 and P5 the 16-bit values stored in the two data buffers would correspond to Y0U0, Y1V0, Y2U2, Y3V2, Y4U4, Y5V4.

Referring still to FIGS. 3 and 4, WRSTC is a pulse generated by the end (falling edge) of VSVY which is passed to latches 304 and 306. Latches 304 and 306 are clocked by LLC as shown in FIG. 3. WRSTC is passed to input WRST and resets the write pointer of the control memory 300. The control memory 300 contains the pixel qualifier signal data associated with the data in the field memory 200 as well as the horizontal synch and vertical synch information. A field flag ("FLDV") indicating whether the data comes from an odd or even field is also stored.

Normally, data is continuously written into the memories. In one particular embodiment, there is a control bit (GPIO0-Write_Enable) in the scaler 100, in the bus interface unit 500 that disables writing of the field memory while the field flag from the SAA7111 is high. This inhibits storage of every other field and allows still more time for the host to retrieve data from the memories. This embodiment is possible because only one field, even or odd, is required to recreate a screen image. This mode limits the video rate to 30 field/sec. Thus, in the event of a bus latency, it is even more unlikely that the write pointer will overrun the read pointer and cause a visual artifact in the image.

The memories are read in a way similar to how they are written. The RRST signals control when the read pointers are reset to the beginning of memory. RRSTD controls the pointer of the field memory 200 and RRSTC controls the pointer of the control memory 300. RRSTD is generated by the memory control block 400 by inverting the VSD signal as shown in FIG. 5. RRSTC is generated by using the VSD signal to operate latch 310. This clocks VCC through latch 310 to the RRSTC output. Latch 310 is cleared by a signal derived from LLC and VSVY as shown in FIG. 3. In operation, latch 310 is used to hold up the read process until the end of the write has completed. The output of AND gate 332 is a pulse coincident with the end of the "write" vertical synchronization signal, or the end of the "WRSTC". This causes RRSTC to be removed and the "read" process commences. Since the read is intended to be completed faster than the write, the VSD becomes active before the VSVY. VSD in turn sets the latch 310, causing RRSTC to be asserted, causing the memory read pointer to be forced back to the beginning position. It is held there by latch 310 until VSVY has completed and the process repeats.

As shown in the figures, it is seen that the data is clocked out of the memories using the PCI clock instead of the LLC clock. This is particularly important in the specific embodiment illustrated because the state machines in the bus interface unit 500 may glitch if one clock (e.g., LLC) is used to transfer data into its internal FIFO while another clock (e.g., PCI Clock) is used to transfer data to the host interface. However, it will be apparent that selection of the bus interface unit 500 is a matter of design choice, and if the bus interface unit 500 is provided with a buffer which allows data transfers at different clock rates, then this feature of the invention is easily adapted to allow data rate conversion by the data transfer FIFO. The manner in which memory control block 400 generates the LLCB signal has been discussed previously. This signal is provided to the write clocks of both memories. The read clocks, ("RCLK"'s), of the memories are clocked by PCI_CLK, which is the PCI bus clock routed through memory control block 400 to the memories.

The field memory 200 read is enabled by RE_Data which in turn corresponds to a valid pixel qualifier coming from the control memory 300 ("PXQC"). The control memory 300 read enable (RE_Ctl) is essentially free running at ½ the PCI clock rate. This is due to the operation of latch 318. This read enable is what is used to halt the read process. When control memory 300 reads are stopped, there are no valid pixel qualifiers to send to the field memory 200 and thus, the field memory 200 is not read and its pointer does not advance.

Data is read out of the field memory 200 until a Vertical Synch ("VSD") is provided by the control memory 300. The end of VSD (falling edge) causes RRSTC, generated by memory control block 400, to become active. RRSTC remains active until the beginning of VSVY provided by scaler 100. VSVY means that a new field has been written into memory and the read process for that newly written field is allowed to start.

Data for the current field is written into memory while data from the previous field is read out. The read process is faster than the write process because a faster clock is used and because the horizontal synch times are compressed by storing only every other transfer from the scaler 100 during the horizontal synchronization time. The read process is synchronized to the write process by waiting for an incoming vertical synch before releasing the read pointers. This faster read process allows for enough time to wait for the FIFOs in the bus interface unit 500 to empty before giving the new data to the PCI Bus interface, and therefore, allows the bus interface unit 500 to set up a new DMA address for scatter/gather DMA. These functions (emptying the FIFO and scatter/gather DMS) are described in greater detail herein.

The power-on default for the write and read processes is to be free running. The flow control functions are enabled in the specific embodiment shown by setting up GPIO bits in the bus interface unit 500. The function of the two enabling bits (Bypass on GPIO2 and SG_Off on GPIO1) are also described in greater detail further herein. These bits default to "high" thus bypassing flow control and disabling scatter/gather DMA.

Since the read process operates faster than the write process, it is possible to read the field memory more than once per write operation. This problem is overcome by the inclusion of latch 310 which has been described previously. The application system memory is designed to accept data only as non-interlaced images. If the read operation is permitted to outrun the write operation, eventually the read pointer will catch the write pointer and produce a "tearing" artifact in the picture. Also, if the read pointer outruns the write pointer, an additional artifact can be produced. The desired field is captured along with part of the alternate field. The resulting visual artifact is a random jumping in a portion of the picture. One embodiment of the invention addresses these problems by using a method to stop the incoming stream of pixel data and to signal this event by using synchronization signals already present in the data stream so that other devices can deal with the event in a standard fashion. It is also used to generate a synthetic horizontal sync when scatter/gather is enabled. There are two modes of operation in addition to the default bypass mode.

The first mode is used to "pace" the data going to the PCI bus. It is turned on by turning off the Bypass bit in GPIO2. In this mode the flow control logic counts a predetermined number of transfers from the field memory 200 to the bus interface unit 500. The read process is then stopped until the bus interface unit 500's FIFO empties. When the FIFO_Empty signal is asserted the counter is released and the read process is restarted where it left off to transfer the next block of data. This mode requires that GPIO3 in the bus interface unit 500 be set up to reflect the FIFO Empty flag of the bus interface unit 500. This is done according to techniques described in the SAA7145 Data Sheets and the Register Program Sequencer ("RPS") code discussed further herein, but in general, these GPIO bits can be set by a program running on the host computer or they can be set by RPS code that the bus interface unit 500 executed out of host memory.

More specifically, the flow control logic comprises DMA control logic 404, 12-bit counter 410 and decoder 408. DMA control logic 404 recognizes each time a transfer is provided to bus interface unit 500, and provides a signal to 12-bit counter 410. The count from the 12-bit counter 410 is provided to decoder 408 which is programmed with a predetermined number of transfers desired. In one embodiment, the FIFO in the bus interface unit 500 is permitted to get about half full, therefore, decoder 408 counts to 256 transfers. In another embodiment, an even greater "cushion" can be provided to prevent overflows in the bus interface unit 500 by lowering the count value of decoder 408 to, for example, eight transfers, or 16-bytes. In any case, when decoder 408 recognizes that the predetermined number of transfers have occurred, it sends a signal to DMA controller 404. DMA control logic 404 then sends a signal to memory interface logic 402 causing it to unassert RE_Data. This inhibits further reads from field memory 200. The bus interface unit 500 requests a DMA transfer to the host memory as soon as it receives a first transfer into its FIFO. Thus, even though no further reads to field memory 200 are possible, the bus interface unit 500 continues to DMA transfer the contents of its FIFO to the host. When all the data has been transferred, the bus interface unit 500 sets a FIFO empty flag which is output to the DMA control logic 404 at GPIO3. DMA control logic 404 then signals memory interface logic 402 to reassert the RE_Data signal and allow reads from field memory 200 to resume.

The second mode is useful in addressing the problems associated with scatter/gather DMA. Many operating systems allocate memory in relatively small blocks scattered throughout the memory space. Although the size of the blocks, address of the blocks, etc., will vary from operating system to operating system, the following embodiment will be described with respect to the AIX operating system, available from IBM. AIX allocates memory in 4096 byte blocks. Application programs see a contiguous block of memory but the demand paged virtual memory manager really uses many 4096 byte blocks that are not necessarily contiguous. The bus interface unit 500 is expecting to DMA data into a contiguous block of memory.

To DMA data into small blocks of memory, it is necessary to stop the data transfer from the bus interface unit 500 to the host processor while a new destination address is loaded. In one embodiment, the invention provides a mechanism to create a synthetic horizontal synch pulse that "fools" the bus interface into believing that a complete line has been transferred so that it can load a new DMA address. The synthetic signal is a signal to the bus interface that a block of data has been transferred and it is now required to take over action before continuing with the next block. During horizontal synchs, pixel data is not valid so this synthetic synch introduces additional time during which the host interface can perform any functions that it needs. The synthetic horizontal synch signal is provided at the HS_Out output of memory control block 400 and is derived from the WRN signal received by bus interface unit 500 as shown in FIG. 3. In one embodiment, the interface simply retrieves the starting address of the next host memory block and continues from there.

More specifically, each field is captured into a user defined buffer. This buffer is contiguous in virtual space, but discontiguous in real space. The size of each discontiguous piece is called a page. In the particular implementation, a page is 4096 bytes long, but the actual page size (as long as it is constant) does not matter.

The field buffer controls, in conjunction with the bus interface unit 500 "active window" capture mechanism, allow the system to capture a page worth of pixels, and temporarily halt the capture so that the address into which the pixels are placed can be changed. This allows the system to change DMA addresses on page boundaries, even when the page boundaries don't fall on line boundaries.

FIG. 6 shows an example of the effect of the field buffer controls for counting pixels (bytes) and inserting fake horizontal synchs and stopping the transfer on physical page boundaries. In this example, the line length is 640 pixels (1280 bytes). The bus interface unit 500 is initially programmed to get an initial active window that is 3 lines high and 640 pixels long. The horizontal sync signals at the end of each of the first three lines are "natural". The 4th line, which naturally would contain 640 pixels, must be terminated early with a synthetic horizontal sync to make the total pixel count stored in the first page 2048 (4096 bytes); thus, the memory controller introduces a synthetic horizontal sync after 128 pixels; it is captured with an active window one line high and 128 pixels wide; the target address for this active window is in the same page as the previous lines. After switching to a new page, the bus interface unit 500 can capture the rest of the 4th line, although to the bus interface unit 500, the remainder of fourth line appears as line 5 due to the synthetic horizontal sync. The fake, or "partial", line 5 is only 512 pixels long; thus the third active window is one line high and 512 pixels wide. It is followed by two full lines terminated by the natural horizontal sync (the fourth active window, with a target address immediately following the 512 pixel line, in the same page). The 7th real line, known by the bus interface unit 500 as the 8th fake line, is terminated early by a synthetic horizontal sync after 256 pixels. Now the page address is changed again, to store the rest of the 7th real line (the 9th fake line). This sequence continues until the entire field is captured.

The scatter/gather mode is activated after taking the memory control block 400 out of Bypass mode. Scatter/gather is activated by deasserting SG_Off as will be described in greater detail further herein. The pacing function described earlier (waiting for FIFO_Empty) is also active. An internal counter 410 in memory control block 400 keeps track of how many byte transfers occur from field memory 200 to bus interface unit 500 and stops the read process when 4096 bytes have been transferred. The counter 410 then generates a synthetic horizontal synch and restarts. The bus interface unit 500 should have set up an active window that ends with this synthetic synch. When the window ends the bus interface unit 500 can set up the next address into which it can DMA. This mechanism requires the use of the bus interface unit 500 register program sequencer ("RPS").

When the memory control block adapter is first turned on all flow control functions are bypassed. To use simple flow control, it is only necessary to write a 0 to GPIO2 of the bus interface unit 500. In the embodiment illustrated, this is accomplished by writing 0x86020303 to the GPIOC register (offset 0x60) of the bus interface unit 500. This value sets up GPIO3 to reflect the value of the FIFO Empty flag. GPIO2 (Bypass) is an output pin with a value of 0. GPIO1(SG_Off) is still high (scatter/gather is off) and GPIO0 (Write_Enable) is an output pin that enables writing of the data memory when the Field Flag of the SAA7111 is high. In order to perform the above described functions, the bus interface unit 500 executes its own internal RPS program. An example of suitable RPS code according to an embodiment of the invention is illustrated in FIGS. 8A–8E and is written in C programming language.

Generally, the RPS code enables scatter/gather DMA by performing the steps of:

(1) Turning on DMA, (2) Waiting for the beginning of a field to turn off both Bypass and SG_Off, (3) Setting up an address to DMA the data, (4) Setting up an active window with a whole number of lines that will result in less than 2048 pixel transfers, (5) Transferring the whole lines, (6) Setting up an active window with the remainder of the 2048 pixels, (this is a partial line), (7) Transferring the partial line, (8) Setting up an active window with the remainder of the line, (9) Transferring the remainder of the line, and (10) Setting up an active window with a whole number of lines that when added to the partial line in the previous step will result in less than 2048 pixels transferred. These steps are continued as required until the whole screen is built up.

An array is defined in the host memory to hold the RPS code to be executed by the SAA7145. Its starting address can be passed to the bus interface unit 500. The example codes in FIGS. 8A–8C assume that the SAA7111, SAA7140 and SAA7145 have been set up with appropriate scale factors and window sizes. Odd fields of 320×420 pixels will be sent directly to the frame buffer of the graphics adapter. The code shown in FIGS. 8A–8C places the odd field in the frame buffer of a graphics adapter. In an operational environment, the addresses used would place the odd fields in a discontiguous buffer in host memory.

The image to be provided to the screen is built up out of smaller windows to insure that there is an active window that ends every 2048 pixels. A new DMA address is set at the end of each active window. As described earlier, the memory control block 400 inserts a synthetic horizontal synch every 2048 pixels so that an active window can be defined to end at this boundary. The synthetic synch is used by the bus interface unit 500 RPS code to detect the end of a line. The RPS code is structured to define an active window that ends at the same pixel count as the line with the synthetic horizontal synch. The code then sets up a new address into which it can DMA the next data.

The code illustrated in the figures sets up an active window of several lines (but less than 2048 pixels). It then sets up a window that ends in the middle of a line to complete the 2048 pixels. The next window is enough to complete the line. The code continues building the picture out of complete and partial lines. FIG. 7 illustrates how the picture is built up according to this embodiment. The process repeats for the rest of the lines that make up a 320×240 picture.

Note that the number of pixels per line is dependent on the scale factor. The example above shows 32 lines of 320 pixels. The double lines denote a 2048 pixel (4096 byte) block boundary. Also, the line counter in the SAA7145 does not correspond to the displayed line. It is counting horizontal synchs, including the synthetic synchs that allow defining a window that ends in the middle of a displayed line.

In the embodiment illustrated, it should be noted that the Phillips Electronics, Inc. SAA7145 should be operated according to techniques to ensure proper operation when the chip is actively using DMA. The active window should finish and the video FIFO should empty before other operations are attempted. Also, the $I^2C$ poil should not be used while DMA operations are in progress.

In still a further embodiment of the invention, there is provided a software implementable method for generating RPS code which controls the scatter/gather DMA. More specifically, conventional implementations for accomplishing scatter/gather DMA included requiring the host processor to update the DMA address, which is not suitable for real-time applications, or pre-programming the adapter to DMA to a set of address locations in memory. Accordingly, in a further embodiment, the invention utilizes the RPS to perform these operations from a set of instructions residing in system memory. FIGS. 9A–9E illustrate a pseudo-code listing according to this version of the invention. This code will be clear to those of skill in the art, particularly in view of the technical documentation for the specific video devices used in this particular embodiment. Accordingly, only certain important features of the code will be described in order not to obscure the present invention. It will be noted that most internal error catching is not shown.

The method begins by allocating one or more buffers to hold captured field data. The steps for performing this step are illustrated in the cap_setup_pool routine. After this step is complete, capture is turned on as described in cap_control. One part of cap_control builds the actual RPS code. This is described in the build_rps_code routine. It is important to note that this step uses the "active window" (AW) technique to force the 7145 to use a new address. Since there are fake horizontal syncs generated, some real lines are split into two "fake" lines. The AW for the second half of a real line (the second fake line) must stall (vertically) one line below the last AW. Separate AWs are used to get any full lines in a page and any partial lines in a page. The same code segment (see put_rps_task), however, with different parameters, is used to capture full lines, partial lines at the end of a page and partial lines at the beginning of a page. The first full lines of a field are an exception.

A field is always captured in cycles of pages. The first page contains some full lines and then a partial line, the next contain a partial line, some full lines, and then a partial line. At some point, the cycle ends with a page containing a partial line and then some full lines. This cycle will repeat until all the lines in the field have been captured. A cycle may terminate early, but will always terminate with full lines.

It will be noted there are two "width families", one for "NTSC" where the width is some submultiple of 640, i.e., 640, 320, 160, 80, and one for "PAL", where the width is some submultiple of 704, i.e., 704, 352, 176, 88. For the families, capturing lines is cyclic as described above; i.e., a line ends at the end of a page after a fixed number of lines, and the cycle repeats; also there is a fixed number of RPS instructions required to capture each cycle; thus a fixed number of cycles fit into a real memory page containing the RPS code. For capturing fields that require more cycles than fit into a page, more than one real page of memory is required, and one must use a branch to jump from one real page of RPS code to the next.

The first step in building the RPS code requires generating the initialization code. The initialization code ensures that the memory control block gets turned on just before an odd field with the 7145 FIFO empty, so that the pixel counter in the memory control block starts counting with the first pixel in the odd field to be captured.

The second step deposits an RPS 'jump' instruction. A later step creates RPS code for capturing a field into a particular buffer in the buffer pool; thus if there are two buffers in the pool, there will be two different segments of RPS code, each with the correct set of addresses for one of the buffer pool buffers. This 'jump' allows the system code to determine into which buffer pool buffer to DMA by adjusting the target of the 'jump.' Buffer 0 is the first buffer used. Note that the jump is conditional on the RPS semaphore. The system code sets the semaphore if there is a buffer pool buffer available. The next step deposits code that turns off capture for the next odd field if there is not a buffer available. This code does so by setting an active window to a size that DMAs only two pixels into an unused portion of a pool buffer.

The next step deposits RPS code to finish the capture of the field and finally to branch back to the 'jump' instruction that represents the start of the field capture code. The finish code simply waits for the combination of the last active window done and the 7145 FIFO being empty. It then generates an interrupt that gets serviced by the svc_intr routine in FIG. 9A–9E.

These first few steps are common to all buffers; the next section of build_rps_code generates code to capture the odd field. It creates a copy of this code for each buffer in the pool. This code implements the method described for FIG. 6 above. Note the use of the 'put_rps_task' for capturing active windows, whether they be partial lines at the beginning or end of a buffer page, or full lines.

While the present invention has been described with respect to specific embodiments, it is to be understood that these are for purposes of illustration and are not to be considered limiting of the invention. Variations in form and detail are within the scope and spirit of the present invention and will occur to those of skill in the art. All publications referenced herein are hereby incorporated by reference as though set forth in full.

What is claimed is:

1. A method for transferring pixel data from a digitizer to a host memory using scatter/gather DMA, the method comprising:

partitioning a contiguous virtual memory buffer in the host into a set of discontiguous real memory pages, the pages being operable to store a first amount of pixel data;

storing pixel data into a buffer in a bus interface unit from a field memory;

defining a first active window of pixel data in the field memory, the first active window having at least one complete line of pixel data, the line including a first number of pixels, the total number of pixels in the first active window being less than a page of memory;

transferring the pixels in the first active window to a first page of memory;

defining a second active window of pixel data in the field memory having a partial line of pixel data by generating synthetic synchronization signals when the total number of pixels for the partial line have been stored into the buffer of the bus interface unit from the field memory, the partial line in the second active window having a second number of pixels, the total number of pixels in the partial line being equal to the difference between the number of pixels in a page of memory and the total number of pixels in the first active window; and transferring the pixels in the second active window to the first page of memory.

2. A method as in claim 1 wherein writing pixel data into the buffer of the bus interface unit is halted when a page of pixel data has been transferred to the buffer of the bus interface unit from the field memory, and re-started when the page of pixel data has been transferred to the host memory.

3. A method as in claim 1 wherein transferring the pixel data from the first active window comprises setting a DMA pointer to the first page of memory.

4. A method as in claim 3 further comprising setting a DMA pointer to a second page of memory when the pixels from the second active window have been transferred to the first page of memory.

5. An apparatus for transferring pixel data from a digitizer to a host memory using scatter/gather DMA, the apparatus comprising:

means for partitioning a contiguous virtual memory buffer in the host into a set of discontiguous real memory pages, the pages being operable to store a first amount of pixel data;

means for storing pixel data into a buffer in a bus interface unit from a field memory;

means for defining a first active window of pixel data in the field memory, the first active window having at least one complete line of pixel data, the line including a first number of pixels, the total number of pixels in the first active window being less than a page of memory;

means for transferring the pixels in the first active window to a first page of memory;

means for defining a second active window of pixel data in the field memory having a partial line of pixel data by generating synthetic synchronization signals when the total number of pixels for the partial line have been stored into the buffer of the bus interface unit from the field memory, the partial line in the second active window having a second number of pixels, the total number of pixels in the partial line being equal to the difference between the number of pixels in a page of memory and the total number of pixels in the first active window; and means for transferring the pixels in the second active window to the first page of memory.

6. An apparatus as in claim 5 wherein the means for writing pixel data into the buffer of the bus interface unit is halted when a page of pixel data has been transferred to the buffer of the bus interface unit from the field memory and re-started when the page of pixel data has been transferred to the host memory.

7. An apparatus as in claim 6 wherein the means for transferring the pixel data from the first active window comprises means for setting a DMA pointer to the first page of memory.

8. An apparatus as in claim 7 further comprising means for setting a DMA pointer to a second page of memory when the pixels from the second active window have been transferred to the first page of memory.

* * * * *

UNITED STATES PATENT AND TRADEMARK OFFICE
CERTIFICATE OF CORRECTION

PATENT NO. : 5,943,504
DATED : August 24, 1999
INVENTOR(S) : Flurry et al.

It is certified that error appears in the above-identified patent and that said Letters Patent is hereby corrected as shown below:

Column 4, Line 2 delete ":PD42280" and replace with --$\mu$PD42280--.

Column 4, Line 15 delete ":PD42280" and replace with --$\mu$PD42280--.

Column 4, Line 16 delete ":PD42280" and replace with --$\mu$PD42280--.

Column 4, Line 17 delete ":PD42280" and replace with --$\mu$PD42280--.

Column 4, Line 66 delete ":PD42280" and replace with --$\mu$PD42280--.

Column 12, Line 8 delete "arc" and replace with --are--.

Signed and Sealed this

Twenty-sixth Day of September, 2000

Attest:

Q. TODD DICKINSON

*Attesting Officer*  *Director of Patents and Trademarks*